United States Patent

Chirdon et al.

[11] Patent Number: 5,228,477
[45] Date of Patent: Jul. 20, 1993

[54] LEAK PREVENTING DEVICE FOR A CLOSED CONTAINER

[75] Inventors: Dave Chirdon, Lincoln; Doug Durney, Dover, both of Del.

[73] Assignee: ILC Dover, Inc., Frederica, Del.

[21] Appl. No.: 850,307

[22] Filed: Mar. 12, 1992

[51] Int. Cl.⁵ .............................................. F16L 55/18
[52] U.S. Cl. .......................................... 138/99; 138/97
[58] Field of Search ................... 138/97, 98, 110, 177, 138/178, 99; 29/402.09, 402.14

[56] References Cited

U.S. PATENT DOCUMENTS

| | | |
|---|---|---|
| 2,727,650 | 12/1955 | Moynihan et al. |
| 3,480,043 | 11/1969 | Proudfoot et al. |
| 3,496,963 | 2/1970 | Bardgette et al. |
| 4,202,379 | 5/1980 | Vetter. |
| 4,357,961 | 11/1982 | Chick ..................... 138/99 |
| 4,448,218 | 5/1984 | Vetter. |
| 4,519,856 | 5/1985 | Lazzara ............... 29/402.09 |
| 4,705,085 | 11/1987 | Brown. |
| 4,880,035 | 11/1989 | Vetter. |
| 5,027,862 | 7/1991 | Laybourn. |
| 5,113,912 | 5/1992 | Vetter ..................... 138/99 |
| 5,146,953 | 9/1992 | Bell ....................... 138/99 |

FOREIGN PATENT DOCUMENTS 359219 10/1931 United Kingdom ............ 138/99

Primary Examiner—James E. Bryant, III
Attorney, Agent, or Firm—Stevens, Davis, Miller & Mosher

[57] ABSTRACT

A device for stopping leaks in the sidewall of a container such as a 50-55 gallon drum comprising a band of flexible but non-elastic plastic material for manually wrapping around the drum so that a central portion of the band is centered over the leak. An integral inflatable bladder on the inner surface of the central portion is inflatable by a $CO_2$ cartridge carried on the outer surface of the central portion. A lanyard runs from a $CO_2$ release valve to one end of the band so that an installer can stand behind the drum while pulling the lanyard to inflate the bladder.

19 Claims, 1 Drawing Sheet

LEAK PREVENTING DEVICE FOR A CLOSED CONTAINER

BACKGROUND OF THE INVENTION

This invention pertains to a device for preventing or stopping leakage from a closed container such as a 50–55 gallon drum, which is the most common liquid container in use in industry at the present time. Such a drum may contain highly toxic or hazardous material and when leakage occurs, for example due to careless handling when loading or unloading, very prompt action is necessary to prevent contamination or evacuation of the working area.

In an attempt to satisfy the need for such prompt leak control there is presently in use kits having a plurality of wedge of various sizes and shapes, but this necessitates time to select the right size and shape to fit the opening and then danger that the person who attempts to install the wedge will be exposed to the leaking fluid. Usually there is not sufficient time to ascertain the nature of the leaking fluid or to don proper protective gear. Another disadvantage of wedges is that part of the wedge is usually left protruding from the drum, making subsequent handling of the drum more difficult.

The prior art also utilizes various types of inflatable pads or bolsters, for example as shown in Vetter U.S. Pat. No. 4,880,035 issued Nov. 14, 1989. Installation of such pads is however time consuming due to difficulty in attachment of securing straps. It also entails danger for the installer because even after the pad is in place over the leak, it is still necessary to attach an inflation means, such as a source of air pressure to a nipple on the pad in order to inflate it.

There is thus a prevailing need in industry for a device to very quickly seal leaks in containers such as 50–55 gallon drums but without a danger to the person doing the installation of that device.

SUMMARY OF THE INVENTION

The present invention very satisfactorily meets the industry needs by supplying an integral, easy to handle, light weight leak preventing or stoppage device that can be very quickly applied, from a side of a container remote from the leak, and then actuated from that remote side so as to completely seal a leak while the installer is in a safe location, that is, the side opposite the leak.

Although it is contemplated that this invention could be applied to a wide variety of sizes and shapes of containers by an appropriate size of the device itself, since a 50–55 gallon drum is so commonly used, the description of a preferred embodiment will be related to the familiar 50–55 gallon drum.

Usually such drums, which are cylindrical containers, are stored on end and, for convenience, this specification will be directed to a drum in that vertical position.

The device in its preferred embodiment comprises an elongated band of a non-stretchable, non-elastic material that will not be adversely affected by contact with most chemicals, that band being long enough to be wrapped around the perimeter of a drum with its end overlapped, e.g. about 78 inches in length. Usually such drums have two radially outwardly projecting reinforcing ribs that are about 16 inches apart. The elongated band of the invention has a maximum width adapted to fit conveniently between such ribs. The ends of the band each have a means to quickly attach to each other, in a preferred embodiment a hook and loop fabric fastener such as that sold under the trademark VELCRO.

The band has a central portion located approximately midway between the ends and in that central portion on the inner surface, that is the surface which would face toward the drum when the band is on place on the drum, is an inflation bladder. This bladder is formed by heat sealing or otherwise securing a circular sheet of a second plastic material to the inner surface of the band. This second plastic material is considerably more elastic than the band so that when the bladder is inflated all of the expansion will take place inwardly, that is toward the drum and there will be little, if any, outward expansion of the band. Thus if it becomes necessary to place the leaking drum inside of an overpack (a cylindrical container of a size to fit over the outside of a leaking container) it is readily possible to do so since the drum with the band thereon is not of a materially larger diameter.

The bladder is preferably inflated by a self contained inflation means comprising a $CO_2$ cartridge or closed vessel which is attached to a release valve. The valve, in turn being securely attached to the band, on the outer surface, opposite the bladder so that it can be readily placed in direct communication with the inflation chamber of the bladder. The valve, in one embodiment has a pivotally mounted activation lever with an inner end that will puncture the $CO_2$ cartridge and an outer end to be pulled in an arcuate path by the person activating the valve.

A lanyard or strong cord is fastened to the outer end of the lever and is strung thru a series of openings in the band so that the distal end of the lanyard is positioned adjacent one end of the band.

Thus an installer can stand behind a leaking drum, swing the band over the top of the drum so that the bladder is aligned with the leaking opening in the drum, pull on the free ends until the band is tight on the drum, secure the band in place by pressing the hook and loop fastening material together (thus stopping some if not most of the leak), and then pull the distal end of the lanyard so as to cause the bladder to inflate against the leak, stopping it completely. During this time the installer is still safely in place behind the drum, remote from the leak. In fact the surface of the bladder is so elastic that it will expand to a limited extent into the leaking opening in the side of the drum.

Preferably the central area of the band has a scuff barrier around it in the form of a loose sleeve of polyethylene sheet material so positioned that part of it will lie between the inner bladder wall and the opening in the drum. That is, if the opening in the drum is caused by a puncture (e.g. by a fork lift truck), that opening may have edges that are sharp or rough. The scuff barrier acts to prevent those edges from puncturing the elastic inner wall of the bladder.

It is thus an object of the invention to provide a device for very quickly sealing a leaking opening in the side of a drum, said device comprising an elongated body of non-elastic material with an integral centrally located inflation bladder of highly elastic material.

It is a further object of the present invention to provide such a device with a self contained inflation means comprising a closed vessel of an expandable material such as $CO_2$ and a means to cause inflation of the bladder, from a side opposite the leak, without the necessity of the installer of the device ever coming into contact with the fluid leaking from the drum.

BRIEF DESCRIPTION OF THE DRAWINGS

Other objectives and advantages of the invention will become apparent upon consideration of the attached drawing which illustrates the invention by way of example and not of limitations, in which.

DETAILED DESCRIPTION OF THE INVENTION

Figure 1:
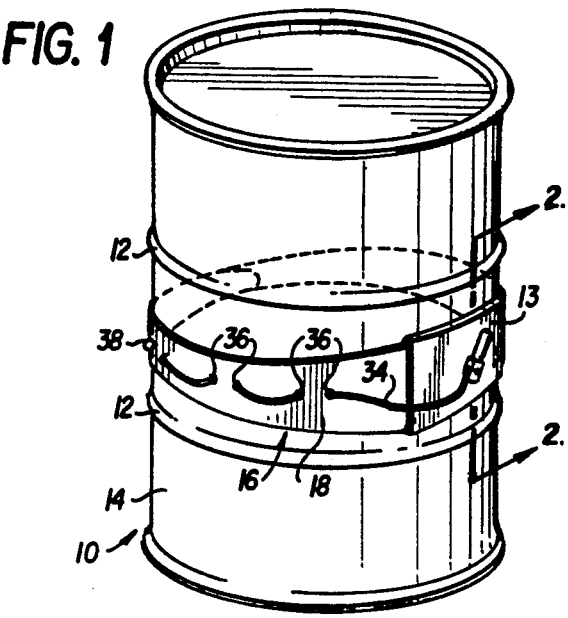
FIG. 1 is a perspective view of a drum having the device of the present invention in place around its central portion.

Referring now to FIG. 1, a container 10 having ribs or chines 12 in the sidewall 14 thereof has the device 16 of the invention wrapped thereabout. The device 16 comprises an elongated band 18 of relatively non-elastic or non-stretchable chemically inert flexible sheet material such as a plastic coated fabric preferably having a Young's modulus of elasticity greater than 19,500 PSI.

The method of determination of the modulus is by the following formula:

$$E = \frac{P_{ult}}{w \cdot t \cdot E_{ult}}$$

where

E = Young's Modulus $P_{ult}$ = Ultimate load as defined by Fed. Std. 191 Method 5030 t = Thickness as defined by Fed. Std. 191 Method 5102 w = Width as defined by Fed. Std. 191 Method 5102

$E_{ult}$ = Elongation at failure as defined by Fed. Std. 191 Method 5102

More preferably the modulus is greater than 100,000 PSI as calculated by the foregoing formula and under the conditions set forth in the designated Federal Standards.

Figure 3:
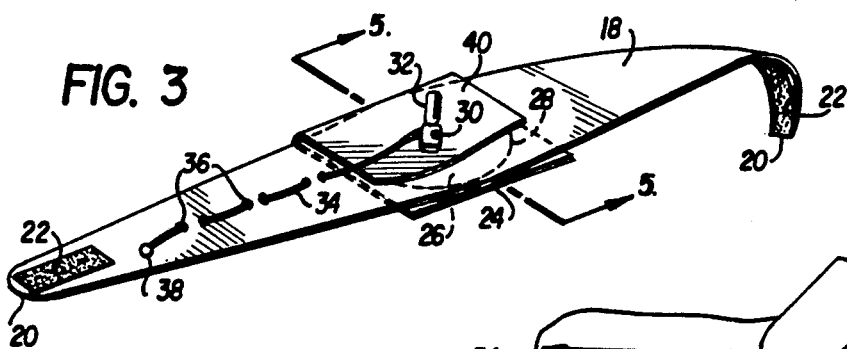
FIG. 3 is a perspective view of the device of the invention showing the bladder wall in dashed lines and the scuff barrier sleeve in place over the bladder.

As shown in FIG. 3 the band preferably is made of flexible coated fabric sheet material and has a maximum width in its central portion 24 with the width becoming gradually narrower toward each end 20. The ends 20 each have a quick connect fastening means 22 such as a hook and loop pile fastener (sold under the trademark VELCRO) so that the two ends 20 can be quickly secured to each other after the band 18 is placed loosely around the container 10 and made snug by a tug on the ends 20 prior to engaging the fastening means 22.

In the central portion 24 of the band there is formed an inflation bladder 13 of which the outer wall thereof is the non-elastic band material 18 of the band itself. The inner wall of the bladder is highly elastic, having a Young's modulus of elasticity less than 3500 PSI at 100% elongation per ASTM standard 412D and more preferably less than 500 PSI at that standard. The material of the bladder inner wall is preferably a laminate of a 0.5 mil (0.0005 inches) thickness of polytetrafluoroethylene (sold under the trademark TEFLON) layer and a polyether polyurethane layer preferably less than 10 mils in thickness.

The great difference in elasticity of the inner and outer walls of the bladder is selected so that upon inflation all or substantially all of the expansion will take place in an inward direction toward the surface of the container and not radially outwardly in a direction tending to enlarge the diameter of the band. Thus if it is desired to place the container with the band thereabout into an overpack, it can be readily done.

Figure 2:
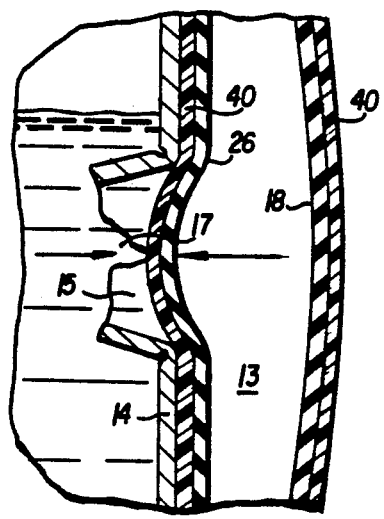
FIG. 2 is an enlarged sectional view taken along line 2—2 of FIG. 1.

FIG. 2 is an enlarged section view along line 2—2 of FIG. 1 showing a puncture hole 15 in the container sidewall 14 causing a major leakage of the container contents. That hole 15 has a rough edge 17 which could cause scuffing or abrading of the flexible inner bladder wall material 26. To guard against such a scuffing it is preferable to have a scuff barrier 40 in the form of a sleeve of polyethylene sheet material about one mil thickness which is loosely fitted over the central portion 24 so as to give an additional layer of protection but without inhibiting the elasticity of the bladder inner wall.

FIGS. 1, 3, 4 and 5 all show the self contained inflation means which comprises a closed vessel 32 of an expandable material such as $CO_2$ in a pressurized container. That container has a threaded neck which is screwable into a threaded opening in the side of a valve body 30 which acts as a release valve means for the $CO_2$ and has a conduit 33 connected through the outer bladder wall so that the $CO_2$ will be admitted directly into the inflation chamber of bladder 13. The conduit 33 has a surrounding shoulder 35 for bearing against the inner surface of the band 18. It has been found that a container of about 8 grams of $CO_2$ is well suited for filling a circular bladder of about 13 inches in diameter which works well on a 55 gallon drum to seal even large gashes such as those caused by ramming with a forklift truck tine.

Figure 4:
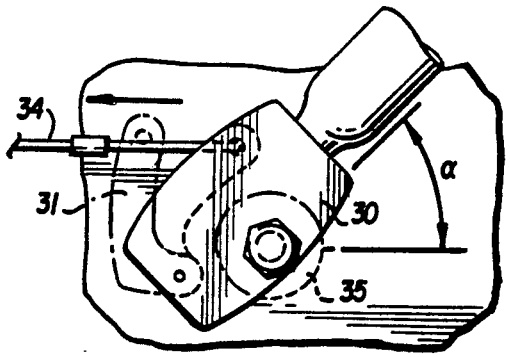
FIG. 4 is a plan view looking toward the release valve shown in FIGS. 1, 3 and 5.
Figure 5:
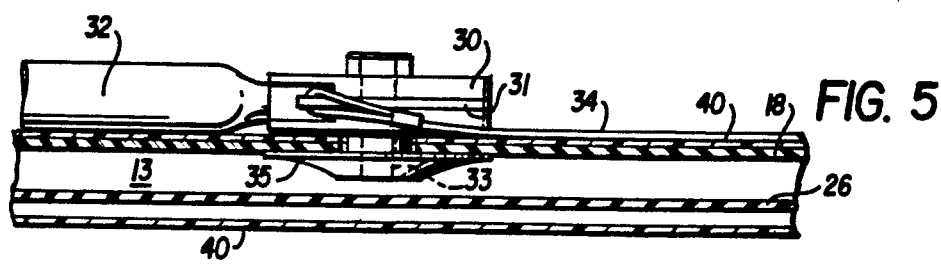
FIG. 5 is a section view taken along line 5—5 of FIG. 3.

The valve 30 has a pivotally mounted actuation lever 31 which serves to puncture the end of the $CO_2$ cartridge 32 when the outer end of the lever 31 is pulled so as to swing in an arc. This arcuate swing is best facilitated by positioning the valve 30 so that the axis of the opening into which the $CO_2$ cartridge is threaded lies on an angle $\alpha$ of on about a 45°, as shown in FIG. 4, in relation to the longitudinal axis of the band 18.

A lanyard 34 is attached to lever 31 and threaded through a series of openings 36 in the band forming support means so that the distal end 38 of the lanyard may be positioned immediately adjacent the point where band ends 20 are overlapped during installation of the band about the drum 10. The scuff barrier sleeve 40 is slid onto the band from one end prior to installation of the release valve 30. The sleeve 40 is of a size to fit snugly over the central area 24. When installing the release valve 30 a cut is made in the sleeve 40 and the end of the conduit 33 is fed through the cut and the release valve is then located on the outside of the sleeve, thus holding the sleeve securely in place as shown in FIG. 4.

The foregoing structure leads to very simple and safe use of the invention even when a dangerous chemical is leaking from an opening 15 in the side of a container. The installer can stand behind the drum, that is on the side opposite the leak, gripping the band 18 by its ends 20. He can then swing the central portion of the band over the top of the drum so as to center the bladder 13 over the leak and, with one pull, move the band against the outer surface of the drum, while pushing the band ends into contact with each other so that the heavy duty loop and pile fastener 22 will immediately grip the ends 20 together and hold the band 18 firmly in place on the drum 10. Immediately thereafter the installer pulls on the distal end 38 of lanyard 34 causing the valve 30 to release the $CO_2$ into the bladder 1 and thus inflate it. The whole operation can be performed in less than 15 seconds, thus minimum leakage will occur.

The foregoing is given by way of example to illustrate the presently contemplated best mode.

Further embodiments and modifications are contemplated to be within the knowledge of those skilled in the art and fall within the scope of the invention as encompassed by the following claims.

We claim:

1. A device for preventing fluid loss from a leaking closed container comprising:
    an elongated band of flexible sheet material for manually wrapping around the container, said band having an elongated body with an inner flat surface, an outer flat surface and first and second ends, the length of said band being sufficient to wrap around at least a major portion of the periphery of said container;
    said body being made of a chemically inert first plastic sheet material having a Young's modulus of elasticity of greater than 19,500 PSI;
    means on said ends for quick mutual attachment of one end to the other end so that said band can be held tightly around said container with said inner flat surface in contact with said container;
    an integral inflatable bladder on the inner surface of said body in a central portion between said ends, so that when said band is wrapped around a container the inflation bladder will be positioned over a source of leakage and on an opposite side from said ends;
    said inflation bladder having an inflation chamber formed by the inner surface of the body and a layer of a chemically inert second plastic sheet material having its edges secured to said inner surface; said second plastic sheet having Young's modulus of elasticity of less than 3500 PSI at 100% elongation;
    self contained inflation means carried on said body for inflation of said inflation chamber comprising a closed vessel of an expandable inflation material connected to said inflation chamber and release means for opening said closed vessel so that said expandable material can flow into and inflate said inflation chamber; and
    remote control means for operating said release means from a position on a side of said container opposite said source of leakage.

2. The device of claim 1 wherein said expandable material is carbon dioxide gas.

3. The device of claim 1 wherein said container is a 50 to 55 gallon drum and said closed vessel contains about 8 grams of carbon dioxide.

4. The device of claim 1 wherein the length of said body is sufficient to wrap around a 50–55 gallon drum so that the ends overlap and the means for quick attachment is a hook and loop fastening material.

5. The device of claim 1 further including a scuff barrier to protect said central portion from physical damage, said scuff barrier comprising a sleeve of plastic material loosely surrounding said body and said bladder in said central area.

6. The device of claim 5 in which said scuff barrier is made of a polyethylene sheet material.

7. The device of claim 1 wherein said second plastic sheet comprises a layer of polytetrafluoroethylene bonded to a layer of polyether polyurethane.

8. The device of claim 7 in which said polytetrafluoroethylene layer is less than 1 mil in thickness and said polyether polyurethane layer is less than 5 mils in thickness.

9. The device of claim 8 in which said Young's modulus of said body is greater than 100,000 PSI.

10. The device of claim 1 in which said second plastic sheet has a Young's modulus of elasticity of less than 500 PSI at 100% elongation.

11. The device of claim 1 in which the first plastic sheet material of said body is made of plastic coated fabric having a Young's modulus of elasticity greater than 19,500 PSI.

12. The device of claim 1 in which said release means is a valve for opening said closed vessel, said valve having pivotal actuating lever and said remote control means is a lanyard connected to said pivotal actuating lever.

13. The device of claim 1 in which said inflation bladder is generally circular having a generally circular periphery defining the edges which are secured to said inner surface.

14. The device of claim 1 wherein said remote control means is a lanyard running along said body from said release means to a position adjacent one of said ends.

15. A device for preventing fluid loss from a leaking container comprising an elongated band of chemically inert first plastic sheet material for wrapping around said container,
    said band having two ends and having a length sufficient to wrap around said container and means on said ends to fasten the ends together to hold the band in a fixed position on said container;
    said band having an inner surface with a central portion between said ends, and an inflation chamber on said central portion formed by a chemically inert second plastic sheet material with peripheral edges secured to said inner surface;
    said second plastic sheet material having a modulus of elasticity less than a modulus of elasticity of said first plastic sheet material;
    self contained inflation means mounted on said band including a closed vessel of an expandable material connected to a release valve for opening said closed vessel, a lanyard connected to said release valve and extending along said band so that said lanyard can be pulled from a position adjacent said ends to operate said release valve from a position remote from a leak in a container and inflate said inflation chamber.

16. The device of claim 15 wherein said expandable material is carbon dioxide gas.

17. The device of claim 15 further including a scuff barrier to protect said central portion from physical damage, said scuff barrier comprising a sleeve of flexible plastic material loosely surrounding said band and said bladder in said central area.

18. The device of claim 17 in which said scuff barrier is made of a polyethylene sheet material.

19. A device for stopping fluid loss from a leaking 50–55 gallon drum comprising:

an elongated band of flexible but relatively non-elastic first sheet material;

said band having a length sufficient to wrap around said drum and two ends having a hook and loop fastening means for quickly securing said ends together;

said band having a width equal to about one third a height of said drum;

said band having an inner surface with a central portion between said ends; a generally circular inflation chamber formed on said central portion by a chemically inert second plastic sheet material with a generally circular peripheral edge secured to said inner surface, said generally circular inflation chamber having a diameter approximately equal to the width of said band in said central portion;

said second plastic sheet material having modulus of elasticity less than a modulus of elasticity of said band so that when said band is wrapped around a drum and said inflation chamber is positioned over an opening in a side of said drum through which fluid is leaking, and the bladder is inflated, the bladder will expand only inwardly toward the drum so as to press against and seal a leak in the drum;

self contained inflation means mounted on said band and connected to said inflation chamber for inflation thereof by actuation from a side of said drum remote from said inflation bladder;

said inflation means comprising a closed vessel of carbon dioxide connected to a release valve, said valve being in communication with said inflation chamber and having an actuation lever with a first end of a lanyard connected thereto, means supporting said lanyard along the length of said band from said valve to one of said two ends, said lanyard having a second end positioned near one end of said band so that a pull on said second end will cause said inflation chamber to inflate.

* * * * *